No. 748,078. PATENTED DEC. 29, 1903.
W. KAISLING.
FASTENING DEVICE.
APPLICATION FILED AUG. 3, 1903.
NO MODEL.

Witnesses
Leonard W. Novander.
Charles J. Schmidt.

Inventor
William Kaisling
By Charles A. Brown
Attorney

No. 748,078. Patented December 29, 1903.

UNITED STATES PATENT OFFICE.

WILLIAM KAISLING, OF CHICAGO, ILLINOIS, ASSIGNOR TO STROMBERG-CARLSON TELEPHONE MANUFACTURING COMPANY, OF ROCHESTER, NEW YORK, A CORPORATION OF NEW YORK.

FASTENING DEVICE.

SPECIFICATION forming part of Letters Patent No. 748,078, dated December 29, 1903.

Application filed August 3, 1903. Serial No. 167,989. (No model.)

*To all whom it may concern:*

Be it known that I, WILLIAM KAISLING, a citizen of the United States, residing at Chicago, in the county of Cook and State of Illinois, have invented a certain new and useful Improvement in Fastening Devices, (Case No. 9,) of which the following is a full, clear, concise, and exact description, reference being had to the accompanying drawings, forming a part of this specification.

My invention relates to fastening devices, and has for its object a novel and improved device adapted to be used in a variety of ways for securing or retaining one object to another.

My invention is very adaptable in the telephone art where it is desired to secure a cover or lid to a box or housing covered thereby or to secure a housing against a mounting, back board, or the like.

I have shown and described my invention as applied to a box for retaining the cover of the box in a closed condition against the body of the box; and, generally speaking, my invention consists of a suitable form of escutcheon-plate secured at the front of the box and a screw having a reduced neck portion, the escutcheon having an opening just large enough to fit about the neck portion of the screw, but too small to allow the screw to leave the plate. A receiving member may be secured to the cover of the box and has a threaded opening disposed to receive the threaded end of the screw, whereby the cover of the box may be secured.

I shall describe my invention more clearly by referring to the accompanying drawings, in which—

Figure 1:
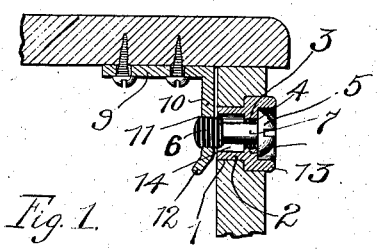
Figure 2:
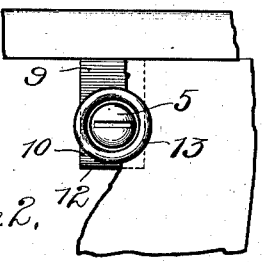

Figure 1 is a vertical sectional view of the device applied to a box. Fig. 2 is a front view thereof, and Fig. 3 shows a modified form of the device.

Like characters of reference refer to like parts throughout the several figures.

The front wall of the box may be provided with an opening 1, and a bushing 2 serves both as a protective lining for the opening and as an escutcheon-plate for the head of the screw. The bushing is divided into two parts by a web 3, which has a threaded opening 4. A screw 5 has a threaded end portion 6, adapted to engage the threaded opening 4, and a reduced neck portion 7. Thus after the screw has been screwed through the opening 4 it is impossible for it to leave the bushing 2 without being unscrewed therefrom. A receiving member 9, which in this case is L-shaped, may be screwed to the cover of the box, the depending member 10 thereof being provided with a threaded opening 11, disposed upon closure of the cover to receive the threaded end of the screw. The end 12 of the depending member is bent downwardly and inwardly, presenting thus a beveled surface to the end of the screw as the cover is closed to push the screw outwardly to allow closure of the cover and to prevent mutilation of the screw-threads. An annular ridge 13 surrounds the head of the screw to protect it when in engaging position with the receiving member 9, while the chamber 14 contains and protects the threaded end of the screw when withdrawn from engagement with the receiving member.

Figure 3:
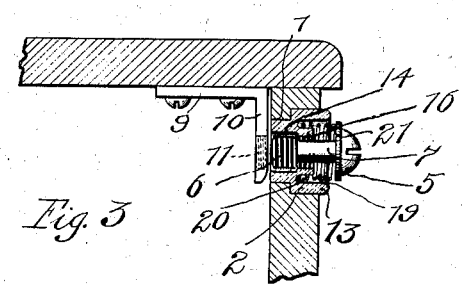

In Fig. 3 I have shown a modification which provides means for protecting the threaded end portion of the screw as work is being carried on inside the box or as the cover is closed. To this end I provide a coil-spring 19, which encircles the screw. To hold the spring in such a position, I provide an annular pocket 20, disposed about the bushing 16, the spring resting in said pocket and abutting against a washer 21, which may be integral with the screw or may be loosely mounted thereon. The annular ridge 13 may be made high enough to encircle and protect the spring during any position of the screw. In this case the receiving member 9 need not be provided with an inclined end, as shown in Fig. 1, the screw upon release from said receiving member being drawn outward by the coil-spring so that the threaded end thereof lies entirely within the chamber 14, the threads being thus saved from mutilation which would otherwise happen were the threaded end allowed to protrude into the interior of the box.

I have described my invention as applied for retaining the cover of a box; but it is evident that the device can be very readily utilized in other directions. I do not, therefore, wish to be limited to a precise construction as described and shown.

I claim as new and desire to secure by Letters Patent—

1. In combination, the wall of a box, an opening through said wall near the top thereof, a bushing for said opening, a web in said bushing, a threaded opening through said web, a screw having a threaded end adapted to be screwed through said threaded opening, a reduced neck portion on said screw, whereby said screw is prevented from leaving said bushing after being screwed through said opening, a receiving member adapted to be secured to the cover of the box, a threaded opening in said receiving member for receiving the threaded end of said screw, and an annular ridge on the front face of said bushing surrounding the head of the screw, substantially as described.

2. In combination, the wall of a box, an opening through said wall near the top thereof, a bushing disposed within said opening, a web in said bushing, a threaded opening through said web, a screw having a threaded end portion adapted to be screwed through said opening, a reduced neck portion on said screw between the threaded end and the head thereof, a receiving member adapted to be secured to the cover of the box and provided with a threaded opening for receiving the threaded end of said screw, and means for retaining the threaded end of said screw entirely without the interior of the box upon disengagement of the threaded end from the receiving member, substantially as described.

3. In combination, the wall of a box, an opening through said wall near the top thereof, a bushing disposed within said opening, a web in said bushing, a threaded opening through said web, a screw having a threaded end portion adapted to be screwed through said opening, a reduced neck portion on said screw between the threaded end and the head thereof, a receiving member adapted to be secured to the cover of the box and provided with a threaded opening for receiving the threaded end of said screw, and a spring for retaining the threaded end of said screw entirely without the interior of the box upon disengagement of the threaded end from the receiving member, substantially as described.

4. In combination, the wall of a box, an opening through said wall near the top thereof, a bushing disposed within said opening, a web in said bushing, a threaded opening through said web, a screw having a threaded end portion adapted to be screwed through said opening, a reduced neck portion on said screw between the threaded end and the head thereof, a receiving member adapted to be secured to the cover of the box and provided with a threaded opening for receiving the threaded end of said screw, a spring for retaining the threaded end of said screw entirely without the interior of the box upon disengagement of the threaded end from the receiving member, and an annular pocket about said opening through the web, in which said spring is disposed upon engagement of said screw with the receiving member, substantially as described.

5. In combination, the wall of a box, an opening through said wall near the top thereof, a bushing disposed within said opening, a web in said bushing, a threaded opening through said web, a screw having a threaded end portion adapted to be screwed through said opening, a reduced neck portion on said screw between the threaded end and the head thereof, a receiving member adapted to be secured to the cover of the box and provided with a threaded opening for receiving the threaded end of said screw, a spring for retaining the threaded end of said screw entirely without the interior of the box upon disengagement of the threaded end from the receiving member, an annular pocket about said opening through the web, in which said spring is disposed upon engagement of said screw with the receiving member, and an annular ridge extending forwardly from said bushing for surrounding said spring and the head of the screw when in engaging position with said receiving member, substantially as described.

In witness whereof I hereunto subscribe my name this 31st day of July, A. D. 1903.

WILLIAM KAISLING.

Witnesses:
CHARLES J. SCHMIDT,
GEORGE S. PINES.